United States Patent [19]

Driver

[11] Patent Number: 4,980,116
[45] Date of Patent: Dec. 25, 1990

[54] LINING OF PIPELINES AND PASSAGEWAYS

[75] Inventor: F. Thomas Driver, Memphis, Tenn.

[73] Assignee: Insituform of North America, inc., Memphis, Tenn.

[21] Appl. No.: 308,633

[22] Filed: Feb. 10, 1989

[51] Int. Cl.$^5$ .............................................. B29C 63/36
[52] U.S. Cl. ...................................... 264/516; 138/98; 156/287; 156/294; 156/94; 264/36; 264/573; 264/269; 425/11
[58] Field of Search ..................... 425/11; 264/36, 510, 264/269, 270, 516, 262, 512, 573; 156/287, 294, 293, 94; 138/97, 98

[56] References Cited

U.S. PATENT DOCUMENTS

| | | | |
|---|---|---|---|
| 3,052,265 | 9/1962 | Nevill | 138/97 |
| 4,009,063 | 2/1977 | Wood | 156/294 |
| 4,064,211 | 12/1977 | Wood | 264/516 |
| 4,350,548 | 9/1982 | Zenbayashi et al. | 264/36 |
| 4,385,885 | 5/1983 | Wood | 264/516 |
| 4,589,446 | 5/1986 | Allen | 138/97 |
| 4,643,855 | 2/1987 | Parkes et al. | 264/36 |
| 4,671,840 | 6/1987 | Renaud | 264/269 |
| 4,678,370 | 7/1987 | Allen | 138/97 |
| 4,786,345 | 11/1988 | Wood | 264/262 |

FOREIGN PATENT DOCUMENTS

| | | | |
|---|---|---|---|
| 61-16842 | 1/1986 | Japan | 264/36 |
| 2082708 | 3/1982 | United Kingdom | 138/97 |

Primary Examiner—Jeffery Thurlow
Assistant Examiner—Mathieu Vargot
Attorney, Agent, or Firm—James & Franklin

[57] ABSTRACT

In order to line a pipeline or passageway active in conveying effluent without interrupting the flow of effluent therethrough, a first bypass conduit is passed through the section to be lined before the lining is inserted and the effluent is pumped therethrough, a second bypass conduit is passed through the lining after it has been inserted but before is has been fixed in position, the effluent is then pumped through that second conduit, the lining is fixed in position, normal effluent flow resumes, and the second conduit can be removed for future use.

18 Claims, 6 Drawing Sheets

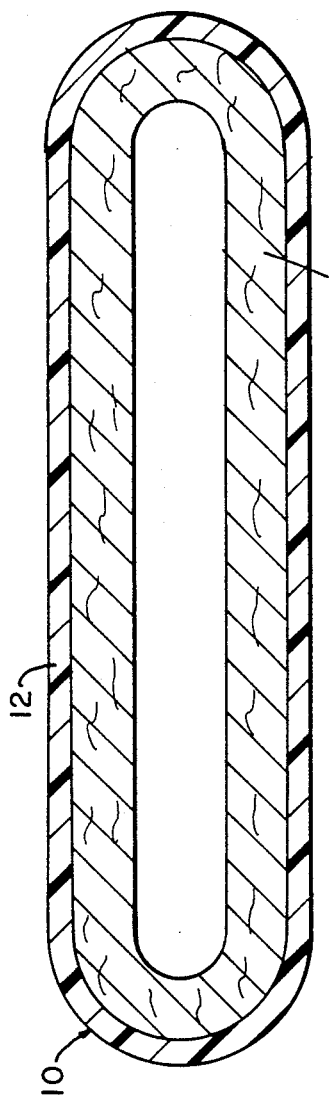
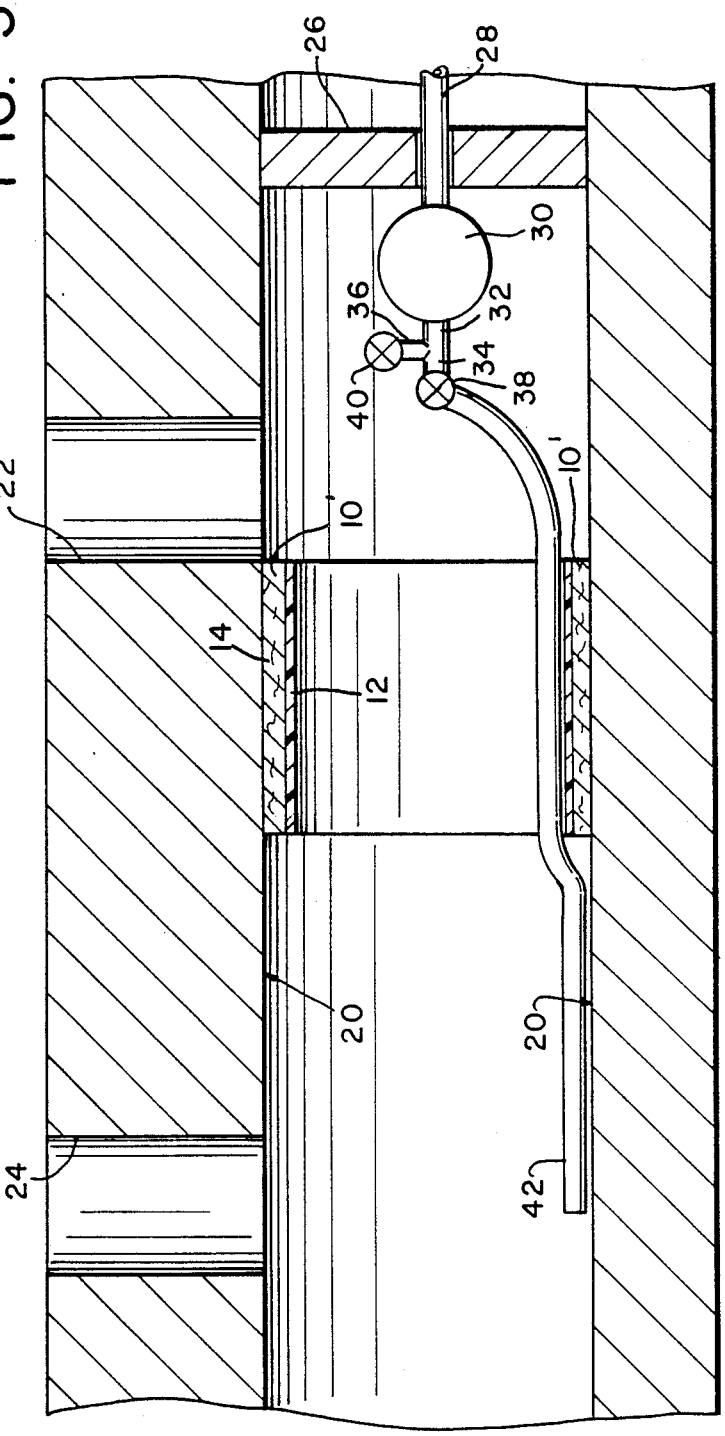
FIG. 4
FIG. 5

LINING OF PIPELINES AND PASSAGEWAYS

BACKGROUND AND SUMMARY OF THE INVENTION

This invention relates to the lining of pipelines and passageways using soft flexible lining tubes which are applied to the pipeline or passageway surface using fluid pressure, said lining tubes either comprising a layer such as a fibrous layer which is impregnated with a curable synthetic resin, or including an adhesive whereby the lining tube is bonded to the pipeline or passageway surface. In the case where the lining tube embodies a curable synthetic resin, the resin is cured while the lining tube lines the surface and upon such curing the tube in fact becomes a hard free-standing pipe of the pipeline or passageway surface. Where the flexible lining tube is bonded to the pipeline or passageway surface the fluid pressure is removed after bonding has been completed.

Various soft lining tube methods are known and are practiced, and in the most commonly practiced method the flexible lining tube is made up of at least one fibrous layer which is impregnated with a curable synthetic resin, and the tube is inverted into and along the pipeline or passageway using fluid pressure to apply the lining tube to the pipeline or passageway surface. In another method, a similarly impregnated lining tube is pulled into the pipeline or passageway, and then an inflation tube is everted into the lining tube, thereafter to be inflated to press the lining tube against the pipeline or passageway surface.

The present invention is concerned with a soft lining tube method wherein the pipeline or passageway is at the time actively conveying its normal contents, and with means for making unnecessary the interruption or external diversion of the liquid which normally passes through the pipeline or passageway when the pipeline or passageway is performing its normal function.

It will be understood that the soft lining methods are used extensively in the lining of sewer pipes or effluent pipes, and the handling of the sewage or effluent, hereinafter called the effluent in the interests of simplicity, while the lining operation is performed can cause difficulties and disadvantages. In the past, the effluent has usually been bypass pumped when the lining operation is taking place over a section of the pipeline or passageway, the effluent being pumped through a tube which is taken to ground level, and the tube returns the effluent to the pipeline or passageway at a position downstream of the section being lined. This technique is relatively satisfactory when relatively small diameter bypass pumping pipes, i.e. of the order of 4–6" diameter, are involved, because the said relatively small diameter pipes are easy to handle, and can be easily positioned and raised and lowered at ground level so as not to interfere with the general equipment used for the lining operation and traffic flow. However, when larger effluent flows are involved requiring the use of larger diameter bypass pipes, i.e. of the order of 12", then not only is considerably more expense involved in providing such a bypass pumping operation, but the handling of such a large diameter pipe at the lining site at ground level creates considerable difficulty. Furthermore, the fraction of the cost of the contract attributable to providing the bypass pumping at ground level increases sharply with the increasing bypass pipe diameter. Also, the bypassing of large diameter sewers can be difficult and risky and interfere to a greater extent with traffic flow in the vicinity.

In accordance with the present invention a bypass conduit extends through the lining tube before it has been fixed in place, so that effluent can flow through that conduit, preferably by pumping, while the steps necessary to secure the lining in place are carried out. The bypass conduit can readily be put into place by being appropriately connected to the lining tube as it is inserted, with an end of the bypass conduit projecting through the remote end of the lining tube after it has been inserted.

Preferably, the method involves connecting a T-junction to a pump which pumps the effluent initially along a discharge conduit lying in the pipeline or passageway, and over which the lining tube is applied, and from the other leg of the T the effluent can be pumped upwardly to ground level and then through the end of the bypass conduit which is inside the lining tube, the discharge conduit eventually being sacrificed when the lining operation has been completed.

The method may be used with the lining method wherein the impregnated flexible lining tube is everted into the pipeline or passageway to line same, or the alternative method wherein the lining tube is pulled into position. The method is also usable in those cases where a flexible lining tube having an adhesive on the inner surface thereof is everted into the pipeline or passageway to be bonded or adhered to the pipeline or passageway surface, as opposed to the formation of a rigid free-standing pipe which results when a thick fibrous material flexible lining tube is impregnated with a curable resin and is shaped to the pipeline or passageway surface and then the resin is cured.

BRIEF DESCRIPTION OF THE DRAWINGS

To the accomplishment of the above, and to such other objects as may hereinafter appear, the present invention relates to a method for lining active pipes without interrupting their activity, as described in this specification taken together with the following drawings, in which:

FIG. 4 is an enlarged sectional elevation illustrating the nature of the flexible lining tube; and FIGS. 5, 6 and 7 are views similar to FIGS. 1–3 but showing various stages in the lining of a section of pipe, after a previous section has been lined, utilizing the present invention.

DETAILED DESCRIPTION OF THE INVENTION

Figure 1:
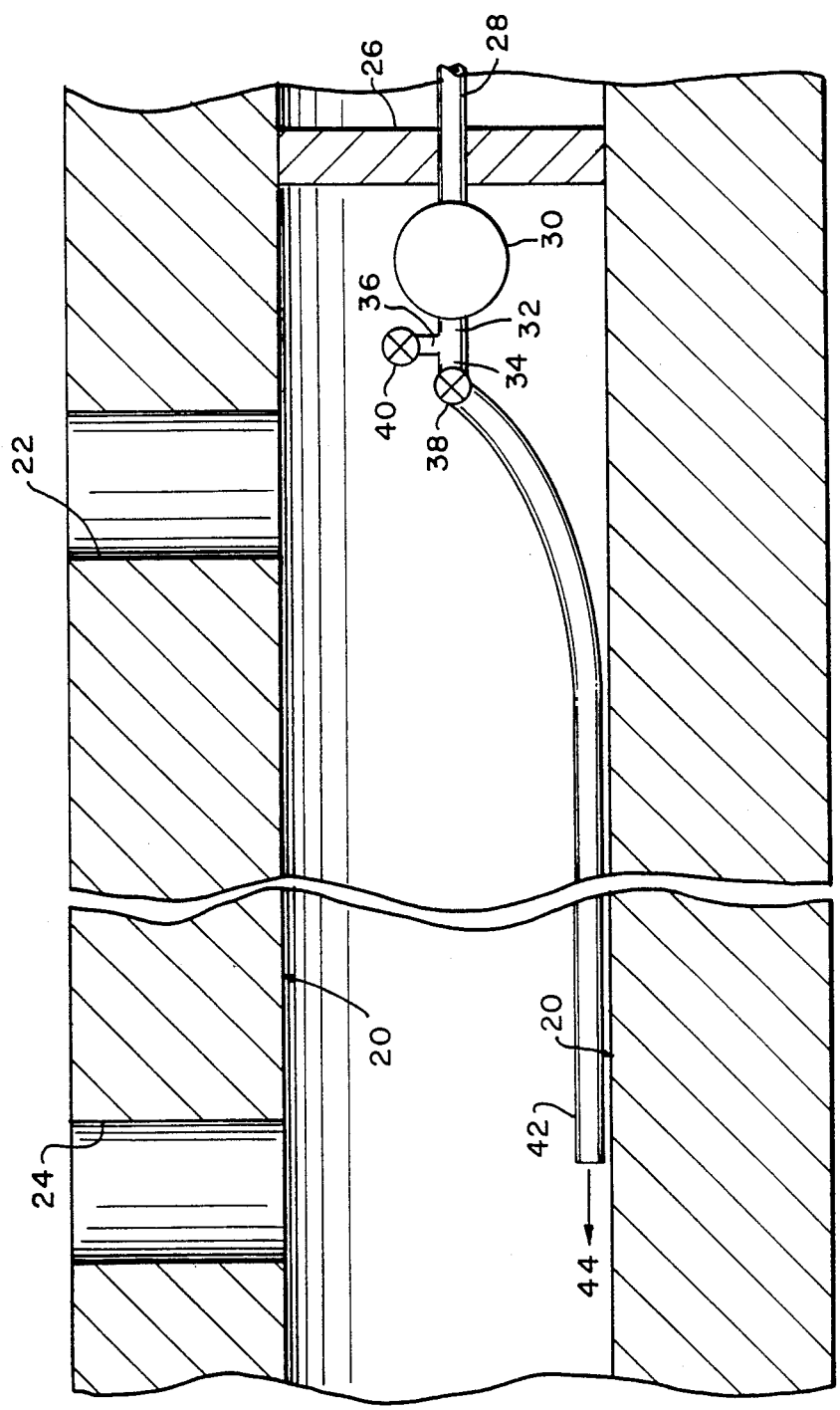
FIG. 1 is a sectional elevation showing a section of sewer pipe to be lined in accordance with the method of the invention.

The invention will be here specifically described in connection with the use of a lining tube impregnated with a synthetic resin curable to a hard condition, which tube is everted into the pipeline or passageway, but that is by way of exemplification only, and the invention is applicable to other specifically different lining methods.

Referring now to the drawings, and first to FIG. 4, a section of a flexible lining tube is illustrated, and the tube, indicated generally by the reference numeral 10, comprises an outer film 12 of impermeable material, to the inside of which is a layer or layers of fibrous material 14. The fibrous material may typically be needled felt of polyester or similar fibers. In use, the fibrous material 14 is impregnated and saturated with a curable synthetic resin material such as a polyester or an epoxy resin, and the flexible lining tube 10 when suitably impregnated is everted into a pipeline or passageway to which the tube is appropriately sized, so as to be forced by fluid pressure against the pipeline or passageway surface. The so-positioned lining is held in position until the resin cures, when the pressure can be removed and the lining remains as a rigid free-standing pipe on the pipeline or passageway surface. This method of applying a lining tube to a pipeline or passageway surface is the subject of and fully disclosed in U.S. Pat. No. 4,064,211 to which reference may be made for specific details.

As can be appreciated, when the method if applied to an underground pipeline such as a sewer (the most common field of application for the method) it is usual to provide that the lining tube is fed into the sewer through a manhole from ground level and while the lining operation is being performed, it is necessary to divert or bypass the sewage which normally flows through the sewer. This is usually done by pumping the sewage through a bypass pipe which is taken to ground level, and the sewage is returned to the sewer at a position downstream of the section of the sewer pipe which is being lined. As has already been mentioned herein, performing this operation is expensive, difficult and risky in the case of large diameter sewers and the cost of bypass pumping in such circumstances tends to be a high proportion of the overall contract price. The disadvantages do not apply to the same extent in the case of small diameter sewers, but they are meaningful even then. The routing of the bypass pipe in itself presents a difficulty, keeping in mind that at ground there will not only be the requirement to keep the bypass pipe clear of traffic and pedestrians, but additionally there will be equipment and apparatus at the site to perform the lining process, and the bypass pipe must be carefully positioned. A particular difficulty arises when the bypass pipe must traverse a highway intersection. When the pipe is of small diameter, i.e. of the order of 4 to 6", it is a simple matter to provide vehicle and pedestrian ramps over the bypass pipe, but obviously if the pipe is of larger diameter, e.g. of the order of 12", then more significant difficulties arise.

Obviously the more expense one must incur in handling the bypass pumping in connection with a lining operation, the more expensive the lining operation becomes, and the less competitive the lining operation becomes compared to alternative lining systems which do not require bypass pumping.

Figure 2:
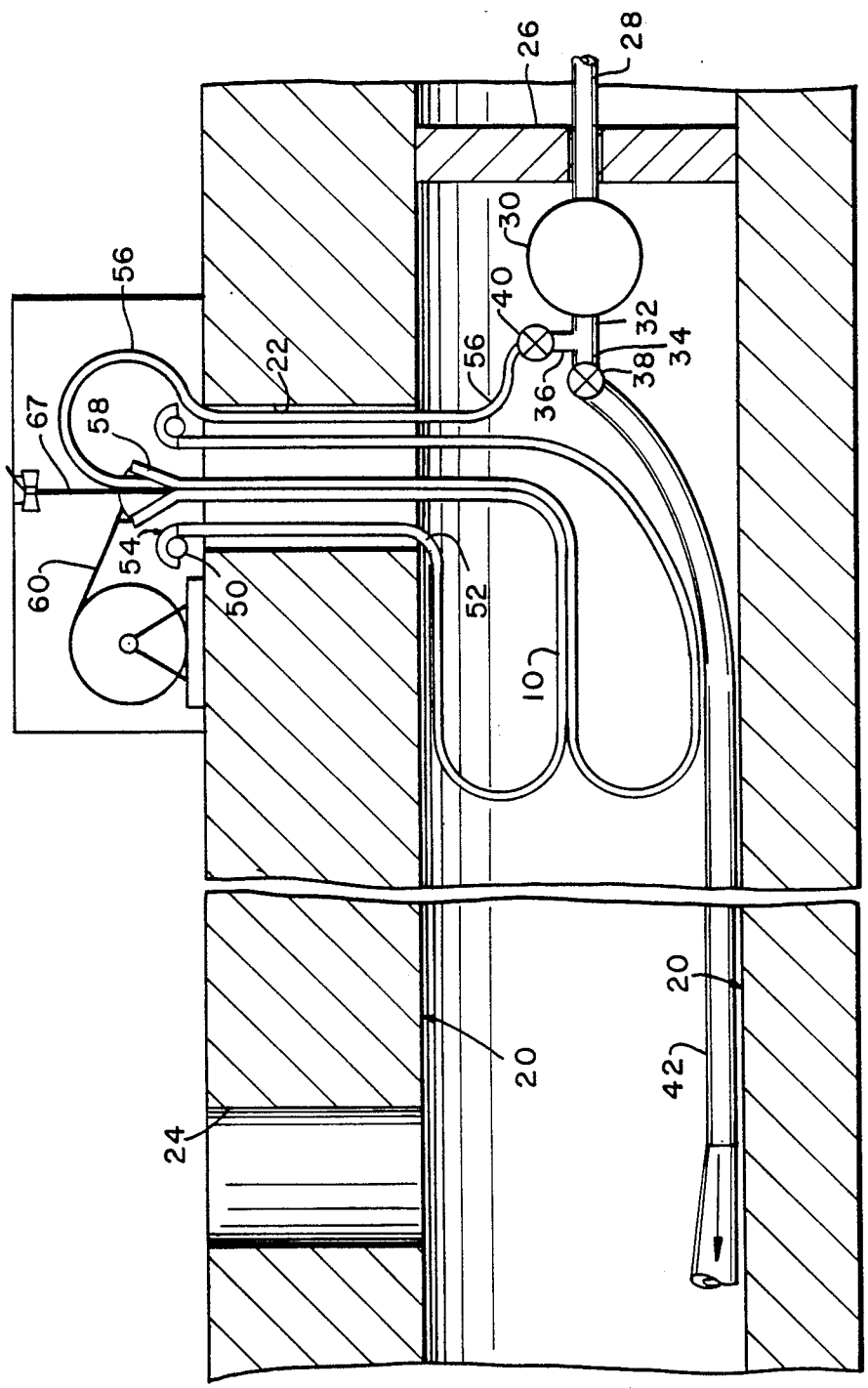
FIG. 2 is a view similar to FIG. 1 but showing the method of operation at an advanced stage.
Figure 3:
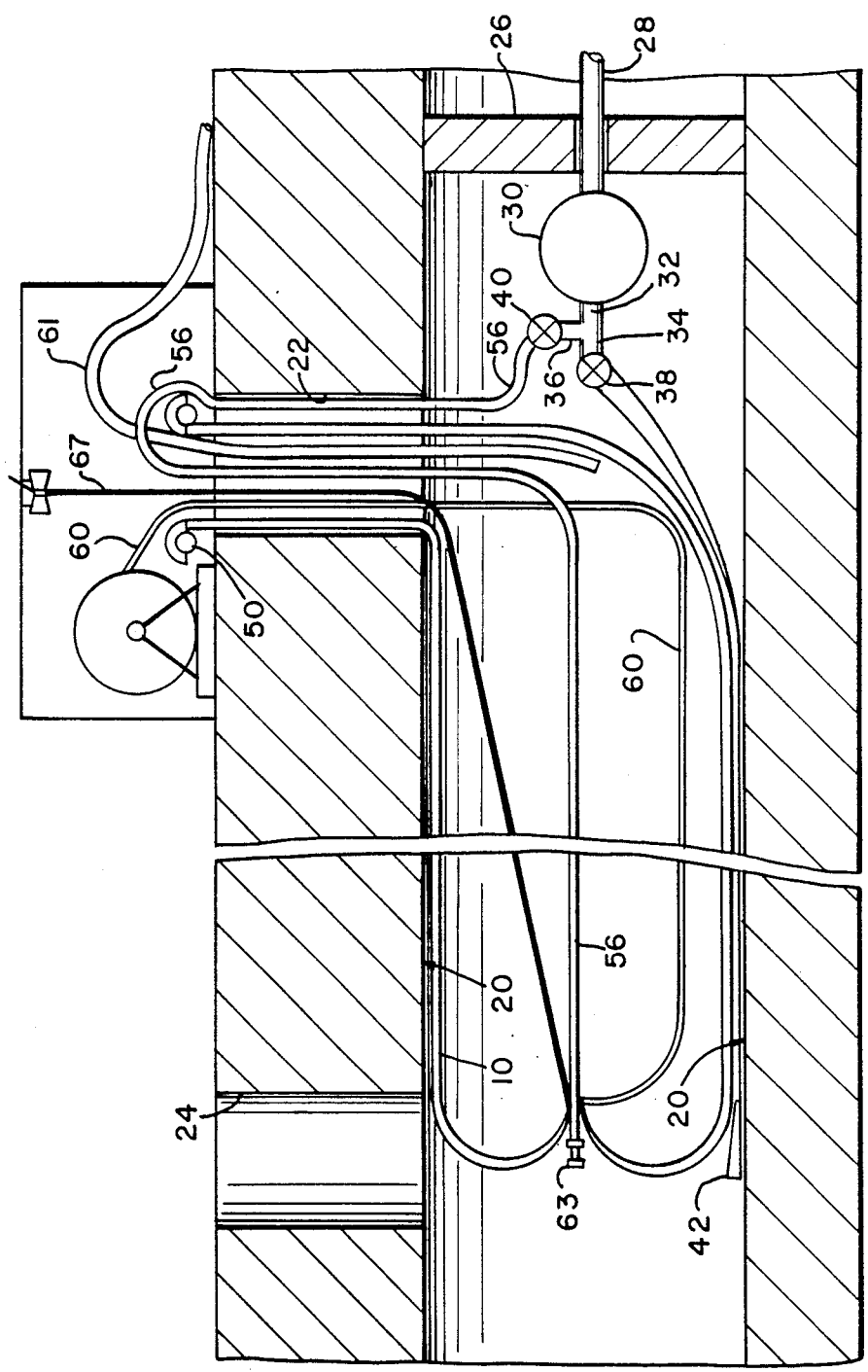
FIG. 3 is a view similar to FIG. 1 but showing the method of the invention at a still further advanced stage.

In the present invention, the difficulties of bypass pumping while the lining operation is taking place are eliminated or substantially reduced, and one embodiment of the method of the present invention is illustrated in the accompanying FIGS. 1 to 3.

Referring to these figures, a section 20 of a sewer to be lined with a resin impregnated lining of the type shown in FIG. 4 is illustrated, that section 20 extending between two manholes 22 and 24, upstream and downstream manholes respectively. In the sewer pipe upstream of the manhole 22 is placed a barrier or plug 26 which blocks flow of sewage through the section 20, but a coupling pipe 28 in the barrier 26 is connected to a pump 30 the outlet 32 of which has a T-piece connected thereto providing two outlets 34 and 36 in turn provided with control valves 38 and 40 whereby flow through said outlets 34 and 36 can be controlled to the extent of being blocked or allowing free flow therethrough.

To the outlet of valve 38 is connected a discharge conduit 42 which extends for the length of the sewer section 20, whereby in the initial stages of the lining process and only as a temporary measure, as shown in FIG. 1, the valve 38 is moved to the open position while valve 40 is closed, and therefore sewage is pumped by the pump 30 through the discharge conduit 42 and is discharged as shown at 44 downstream of the manhole 24. When this condition is established, the section 20 of the sewer is in condition to be lined with a lining tube such as the one shown in FIG. 4.

Referring now to FIG. 2, which shows a subsequent stage of the lining operation, to perform the lining operation an inversion ring 50 is installed above ground at the manhole opening 22. The leading end of the lining tube 10 is attached to the top of the ring 50 as shown, and then the lining tube 10 is everted into the pipeline or passageway as shown in FIG. 2 by inserting an everting liquid, usually water, into the top end of the ring 50 as shown by arrow 54. The pumping of the sewage through discharge pipe 42 continues during this eversion operation, but additionally a bypass conduit 56 is connected to the valve 40 at one end, and at its other end it is connected to the trailing end of the lining tube 10 as indicated by reference 58. Also to said trailing end is connected a hose 60, which is known as a "lay-flat" hose.

The lining operation proceeds by eversion of the lining tube 10 until the condition shown in FIG. 3 is reached, the bypass pipe 56 trailing end 63 projecting beyond the trailing end of the lining 10. A suction hose 61 is inserted as shown. The lay-flat hose 60 is used for pumping hot water into the interior of the lining 10, in order to initiate and effect the cure of the resin impregnating the layer or layers 14 of the lining tube, and that hot water is circulated within the lining 10 by being pumped out through the suction hose 61, reheated in an external boiler, and then pumped back into the lay-flat hose 60. Also at this time, the valve 38 is closed, while valve 40 is opened, and therefore the sewage is pumped through the bypass conduit 56 which, as can be seen from FIG. 3, lies inside the lining tube 10. The sewage issues from the end 63 of the bypass conduit 56, and therefore is fed into the sewer downstream of section 20 which is being lined. The discharge conduit 42 collapses and forms part of the lining tube and is therefore sacrificed.

Thus, during the time while the curing is taking place, which period can be substantial, the effluent is pumped through the lining tube in the passageway and therefore does not cause any destruction or problem at ground level. Completion of the lining operation occurs when the resin in the layer or layers 14 has cured to hard condition, after which the hydraulic pressure maintaining the lining tube against the sewer surface can be removed, and the conduit 56 can be extracted along with the lay-flat hose 60 and the suction hose 61, all of which can then be reused.

The method described has certain advantages as applied to the particular lining method described in that it does not require the development of a new ambient cure resin. There is no requirement to develop new methods of wetting out the lining tube 10 with the curable resin or to specially adapt the lining tube for the process as may otherwise be required.

The utilization of a pump and discharge tube in the arrangement shown in FIG. 1, in addition to providing that the lining process can be carried out as described herein, also has the advantage that when the sewage is being discharged through the pipe 42, cleaning and inspection of the section 20 of the sewer is facilitated.

The above-described process is repeated for such section of sewer to be lined after the end of the previously applied cured lining tube has been trimmed with a suitable cutter in conventional fashion.

The above description was of a situation where the sections of passageway which are lined extend from manhole to manhole. If a section between manholes has to be lined in two stages for whatever reason, then a modification of the procedure described may be adopted. Referring to FIG. 5, in this modified procedure, where the previously inserted length of lining is designated 10', again the initial discharge is achieved through a discharge conduit 42 extending from the pump 30 to the position where the second inversion will end.

Figure 6:
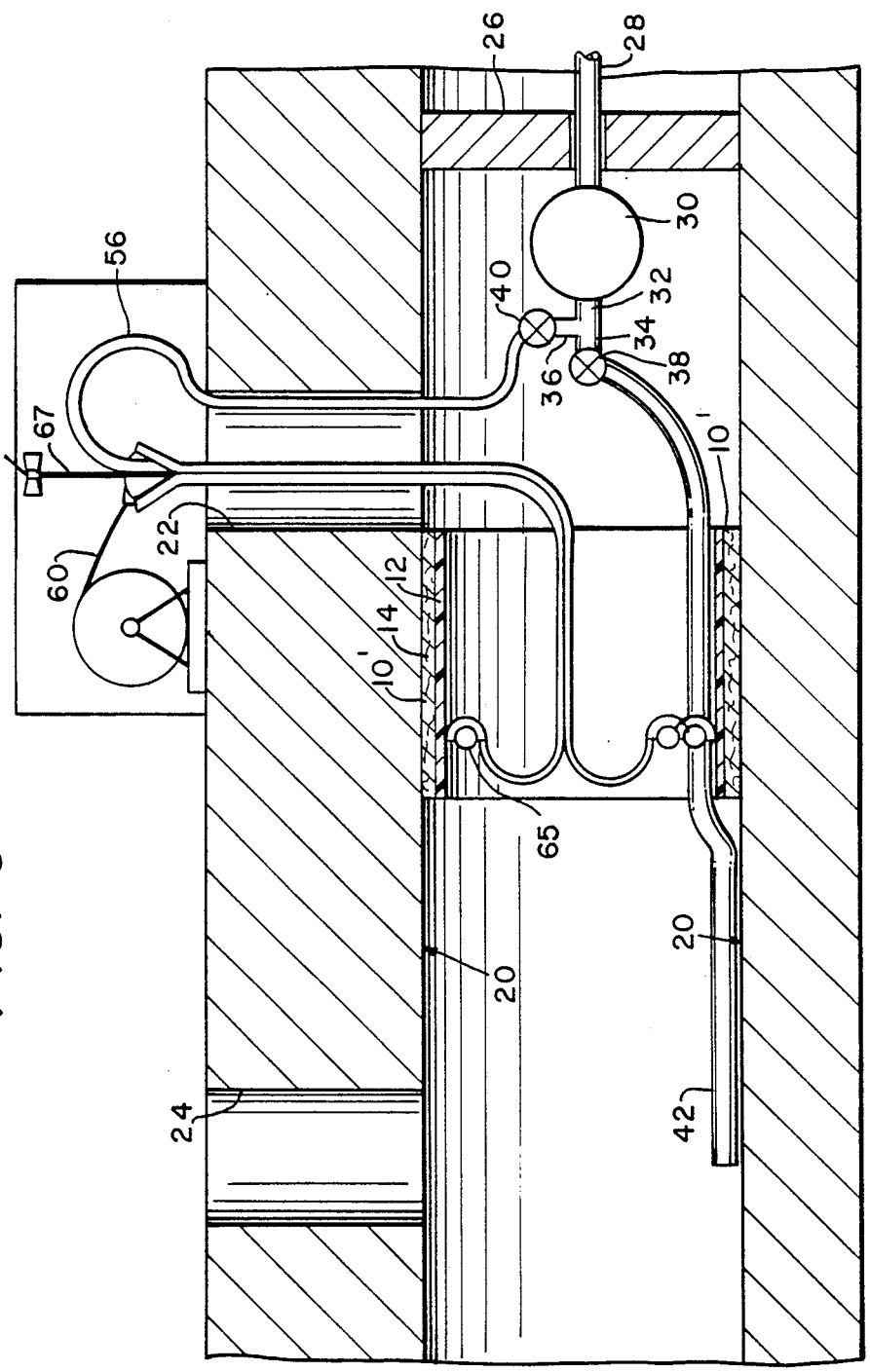

As shown in FIG. 6, the inversion end of the lining tube 10 will be fed through the previously applied section 10' of lining tube to a point near the end of that section 10' where it will be attached to an internally installed inversion ring 65. The inversion of the lining tube 10 will start at this point. As was the case in the previously described embodiment, to the end of the lining tube 10 will be attached a lay-flat hose 60 as well as the bypass conduit 56 the end 63 of which is so connected thereto that when the lining tube 10 is fully everted that end 63 will extend out from the end of the lining tube 10. A hold-back rope 67 may also be provided if required (and such a hold-back rope 67 could also be provided in connection with the procedure discussed in FIGS. 1–3). The procedure as described above is then carried out to fix the lining tube 10 in place, and then remove the bypass conduit 56, lay-flat hose 60 and hold-back rope 67 if used.

In order to avoid having to heat water filling both the first and second sections of the pipeline in order to set the plastic only in the second section, an inflated plug 64 may be attached to the hold-back rope 67; the lay-flat hose 60, suction hose 61 and bypass conduit 56 passing through that plug 64. The open end of the suction hose 61 opens to the left-hand end of the plug 64. When the second section of the lining tube 10 is fully everted, the plug 64 will be positioned at the end of the first lined tube length 10'. Hence the amount of water which must be heated and recirculated to cure the resin in the second section of the lining tube 10 is limited to that required to substantially fill that second section alone.

Figure 7:
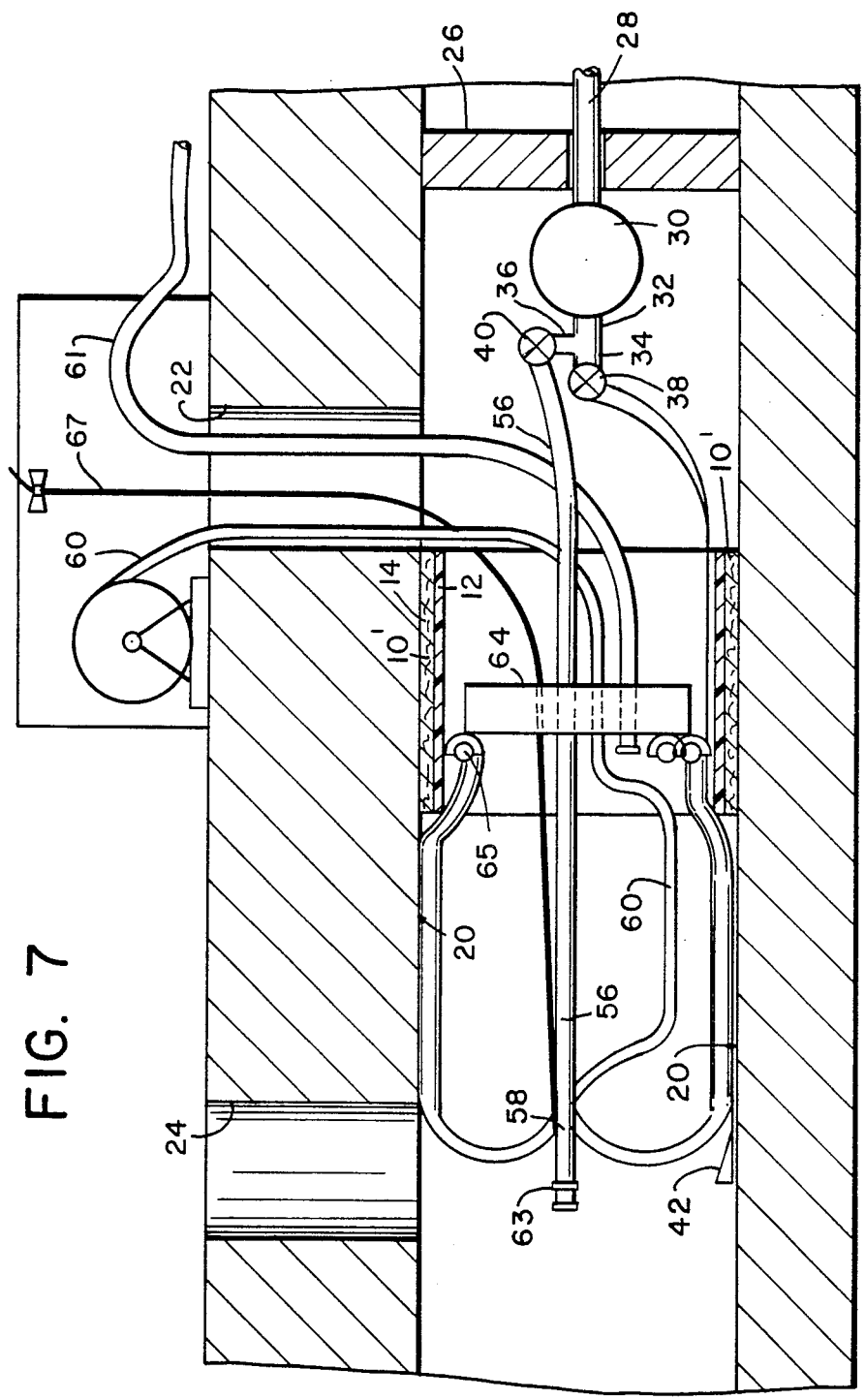

Whether the length of the sewer section 20 will be lined in one stage, as shown in FIGS. 1–3, or in two or more stages as shown in FIGS. 5–7, is dependent upon economics.

It will be seen from the above that through the use of the procedure here disclosed, the lining of lengths of pipe which are actively engaged in conveying effluent can be accomplished without having to either interrupt the activity of the pipe or bring the effluent to ground level and then redirect it into the pipe downstream of the section being lined. Moreover, the use of the method here disclosed does not require any modification of the basic lining procedure, and is adaptable to different lining procedures.

It will be apparent that many variations may be made in the specific details of the lining method, all within the scope of the invention as defined in the following claims.

I claim:

1. The method of lining a length of pipe active in conveying effluent by fixing the lining in place in the pipe which comprises:
   (a) placing a lining in said pipe along said length;
   (b) exerting fluid pressure inside said lining to press said lining against the inner surface of said pipe;
   (c) providing a conduit inside said lining along said length before said lining has been fixed in place;
   (d) causing said pipe effluent to flow through said conduit and out of the open end thereof into said pipe downstream of said length; and
   (e) fixing said lining in place in said pipe against the inner surface of said pipe, in which step (a) comprises everting said lining into said pipe length, and step (c) comprises attaching the open end of said conduit to the trailing end of said everting lining so that said open end of said conduit opens to the outside of said everted lining, said conduit extending along said pipe length by being pulled by said trailing end of said everting lining.

2. The method of lining a length of pipe active in conveying effluent by fixing the lining in place in the pipe which comprises:
   (a) providing a first conduit in said pipe along said length and causing said pipe effluent to flow therethrough into said pipe downstream of said length;
   (b) placing a lining in said pipe along said length and over said first conduit;
   (c) providing a second conduit inside said lining along said length before said lining has been fixed in place;
   (d) causing said pipe effluent to flow through said second conduit and out of an open end thereof into said pipe downstream of said length; and
   (e) exerting fluid pressure inside said lining to press said lining against the inner surface of said pipe and fixing said lining in place in said pipe, in which step (b) comprises everting said lining into said pipe length, and step (c) comprises attaching the open end of said second conduit to the trailing end of said everting lining so that said open end of said second conduit opens to the outside of said everted lining, said second conduit extending along said pipe length by being pulled by said trailing end of said everting lining.

3. In the method of either of claims 1 or 2, the step of removing said inside-the-lining conduit after said lining has been fixed in place in said pipe.

4. The method of claim 2, in which said first conduit is radially collapsible when pipe effluent is not flowing therethrough.

5. The method of claim 4, in which said second conduit is removed from inside said lining after said lining has been fixed in place in said pipe.

6. The method of claim 4, in which step (d) includes stopping said pipe effluent from flowing through said first conduit.

7. The method of claim 6, in which said second conduit is removed from inside said lining after said lining has been fixed in place in said pipe.

8. The method of either of claims 1 or 2, in which said pipe effluent is caused to flow by pumping said effluent through said conduits.

9. The method of claim 8, in which said inside-the-lining conduit is removed after said lining has been fixed in place in said pipe.

10. The method of claim 2, in which step (d) includes stopping said effluent from flowing through said first conduit.

11. The method of claim 10, in which said second conduit is removed from inside said lining after said lining has been fixed in place in said pipe.

12. In the method of claim 8, obstructing normal flow of effluent at a point upstream of said length, said conduit or conduits being there operatively connected to said pipe via means for performing said pumping.

13. In the method of either of claims 1 or 2, obstructing normal flow of effluent at a point upstream of said length, said conduit or conduits being there operatively connected to said pipe.

14. The method of lining a length of pipe active in conveying effluent which comprises:
   (a) placing a lining in said pipe along said length;
   (b) providing a conduit inside said lining along said length before said lining has been fixed in place;
   (c) causing said pipe effluent to flow through said conduit and out of the open end thereof into said pipe downstream of said length; and
   (d) fixing said lining in place in said pipe,
in which step (a) comprises everting said lining into said pipe length, and step (b) comprises attaching the open end of said conduit to the trailing end of said everting lining so that said open end of said conduit opens to the outside of said everted lining, said conduit extending along said pipe length by being pulled by said trailing end of said everting lining.

15. The method of lining a length of pipe active in conveying effluent which comprises:
   (a) providing a first conduit in said pipe along said length and causing said pipe effluent to flow therethrough into said pipe downstream of said length;
   (b) placing a lining in said pipe along said length and over said first conduit;
   (c) providing a second conduit inside said lining along said length before said lining has been fixed in place;
   (d) causing said pipe effluent to flow through said second conduit and out of an open end thereof into said pipe downstream of said length; and
   (e) fixing said lining in place in said pipe
in which step (b) comprises everting said lining into said pipe length, and step (c) comprises attaching the open end of said second conduit to the trailing end of said everting lining so that said open end of said second conduit opens to the outside of said everted lining, said second conduit extending along said pipe length by being pulled by said trailing end of said everting lining.

16. In the method of either of claims 14 or 15, the step of removing said inside-the-lining conduit after said lining has been fixed in place in said pipe.

17. The method of either of claims 14 or 15, in which said pipe effluent is caused to flow by pumping said effluent through said conduits.

18. In the method of either of claims 14 or 15, obstructing normal flow of effluent at a point upstream of said length, said conduit or conduits being there operatively connected to said pipe.

* * * * *